United States Patent [19]

Fordham et al.

[11] Patent Number: 5,067,901
[45] Date of Patent: Nov. 26, 1991

[54] SIMULATED MULTIMETER

[76] Inventors: Donald S. Fordham, 6888 Granero, El Paso, Tex. 79912; Richard A. Petersen, 5436 Van Horn, El Paso, Tex. 79924; Charles E. Gorbet, 3356 Menard La., El Paso, Tex. 79936

[21] Appl. No.: 436,527

[22] Filed: Nov. 14, 1989

[51] Int. Cl.$^5$ .............................................. G09B 19/00
[52] U.S. Cl. .................................... 434/224; 434/219; 434/365; 434/366; 324/115
[58] Field of Search ............... 434/219, 224, 365, 366, 434/369, 379; 324/115, 116

[56] References Cited

U.S. PATENT DOCUMENTS

| | | | |
|---|---|---|---|
| 4,316,720 | 2/1982 | Ackerman | 434/224 |
| 4,748,404 | 5/1988 | Heinze et al. | 324/115 X |
| 4,789,824 | 12/1988 | Henkelmann | 324/115 X |

Primary Examiner—Richard J. Apley
Assistant Examiner—Joe H. Cheng
Attorney, Agent, or Firm—Denis G. Maloney; Richard M. Sharkansky

[57] ABSTRACT

An apparatus for simulating a multimode meter having a pair of test leads, a function switch, and a range select switch is provided. The simulated multimeter apparatus is fed by digital display data signals and provides a numeric display representative of a number corresponding to digital data display signals. Further, the simulated multimeter apparatus is fed by a plurality of switch signals which correspond to predetermined locations of the function and range select switches and fed by an input data stream corresponding to simulated electrical parameter values, related to the values of the functions switch and the range switch, for converting the input data stream into the digital display data signals.

7 Claims, 4 Drawing Sheets

SIMULATED MULTIMETER

BACKGROUND OF THE INVENTION

This invention relates generally to system simulation and more particularly to measurements of simulated electrical parameters.

As it is know in the art, many complex electrical, or electromechanical systems require regular maintenance, and repair by persons who must be specifically trained in maintaining and repairing of such a system. It is also known that high voltages AC and/or DC voltages are often present in the actual system. With modern complex modularized systems generally most repair and maintenance routines involve removing and replacing of modules or circuit boards while power is turned off in accordance with a maintenance or repair manual scenario.

Nevertheless, it is often necessary to take voltage and/or resistance measurements on the actual system to further isolate or trouble-shoot the system. Such is often the case in power distribution portions of a complex system.

There exists a problem with training a person to repair a system, where such person might be exposed to high voltages. Using the actual system to take high voltage measurements with high voltages present presents a danger to the person and to the hardware if the measurements are taken incorrectly. One solution to this problem is to provide a simulation of the actual system. However, to train a person to repair a power distribution network of the system by using a simulator would generally necessitate having high voltages present in the simulator or foregoing routines in which the trainee takes measurements of high voltages. However, when using a simulator to train persons in repairing a system it is generally desirable not to have such high voltages present in the simulator, in order to prevent injury. Accordingly, without such high voltages present often such measurements are not taken. This obviously reduces the effectiveness of the training routine.

SUMMARY OF THE INVENTION

In accordance with the present invention, apparatus for simulating a multimode meter having a pair of test leads, a function switch, and a range select switch includes means fed by digital display data signals, for providing a numeric display representative of a number corresponding to said digital data display signals, and control means fed by a first plurality of signals which correspond to predetermined locations of said function switch and range select switch and fed by a second plurality of signals corresponding to simulated measured electrical parameter values, related to the values of said functions switch and said range switch, for converting said second plurality of signals into the digital display data signals. With this particular arrangement, a simulated multimeter is provided. The multimeter includes a pair of test leads, which may be used by a trainee to probe a circuit module or other connections on a system. The simulated multimeter has a function select switch and a range select switch. The control means feeds the first plurality of signals corresponding to the range selected and function selected by such switches to a user device. Such signals are used to provide the second plurality of signals from the user device and which are fed to the control means to simulate a measured electrical parameter. The second plurality of signals are converted into the digital display data. The digital display data signals are fed to the displays to provide a display corresponding to a simulated value of an electrical parameter which is simulated in the simulated system. Accordingly, an operator or a maintenance technician or trainee will receive training in taking high voltage measurements, for example, in a simulated system without the necessity of having actual high voltages present thereby reducing the possibility for serious injury to the person or the equipment.

BRIEF DESCRIPTION OF THE DRAWINGS

The foregoing features of this invention, as the invention itself, may be more fully understood from the following detailed description of the drawings, in which.

DESCRIPTION OF THE PREFERRED EMBODIMENTS

Figure 1:
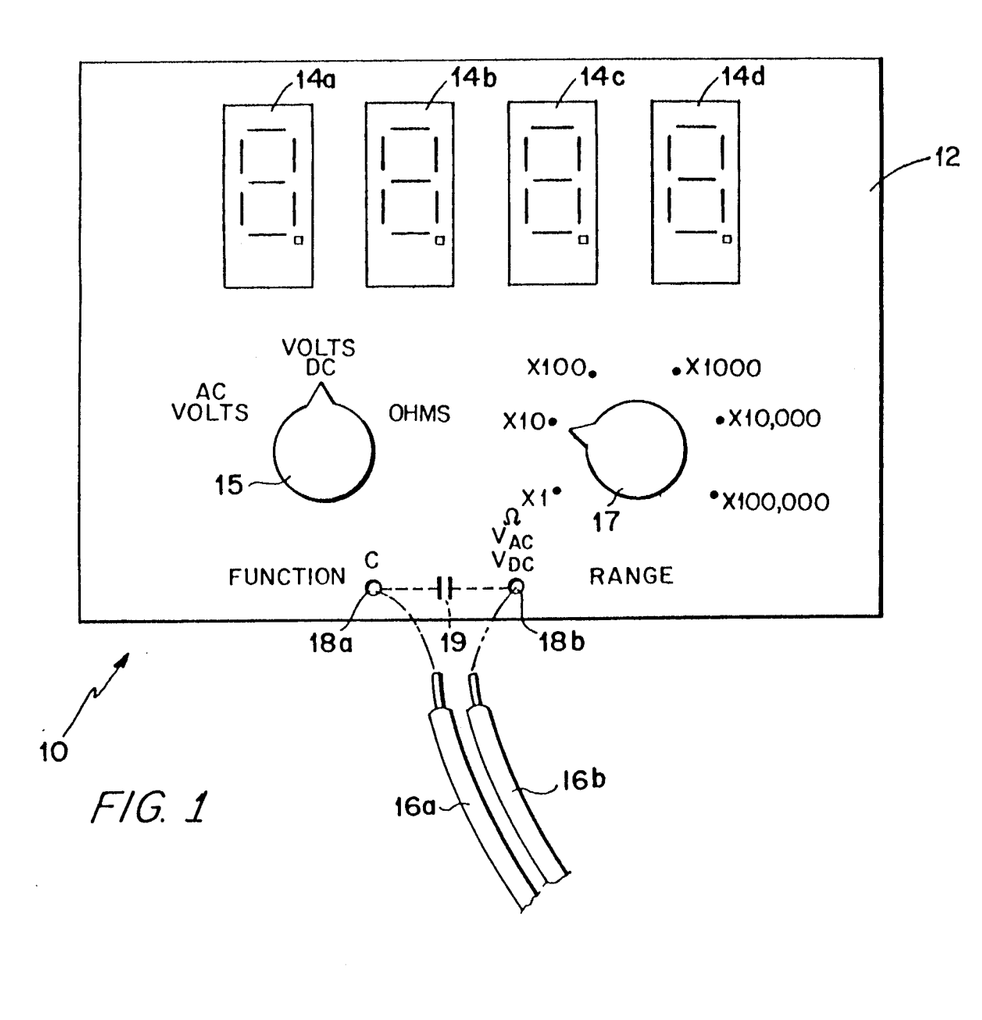
FIG. 1 is a diagrammatical view of a front panel of a simulated multimeter in accordance with the present invention.

Referring now to FIG. 1, a simulated multimeter 10 is shown to include a control panel 12 having disposed thereon here four, seven segment LED (light emitting diode) displays 14a-14d, which are fed digital display data signals to provide a numeric display between 0-9 corresponding to the value representation of said digital display data signals. Here each one of said displays further includes a decimal point indication (not numbered), which is used to provide a decimal point in the 4-digit display. The control panel 12 also includes a function switch 15, which here has three positions, volts AC, volts DC, and ohms, as well as a range select switch 17, here having six positions, X1; X10; X100; X1K; X10K; and X100K (where K stands for 1000). The control panel 12 further includes a pair of connectors 18a, 18b as commonly found on digital multimeters with one of said connectors 18a being labelled C for common or ground and the other one of said connectors 18b being labelled Ohms, VDC, VAC, as shown. Behind the pair of connectors 18a, 18b is connected a capacitor 19. Test leads 16a, 16b are inserted into connectors 18a, 18b, as shown.

Test leads 16a, 16b make connection to the capacitor 19, which is here mounted on the backside of control panel 12, and is thus shown in phantom. The test leads 16a, 16b do not contact the multimeter electronics, as will be described in conjunction with FIG. 2. Suffice it here to say that the simulated multimeter is used in a system simulator. The multimeter leads 16a, 16b are used to test or probe terminals or connections in the system simulated. When the test leads are on a proper pair of terminals, apparatus in the simulated system will detect that the test leads have completed a circuit, or thus have closed a signal path. A determination will be made in the simulator as to whether the proper test points have been probed by the test lead 16a, 16b. If such connections are proper, the simulator can send a stream of digital data to the multimeter, as will be described, to provide a display corresponding to a simulated measured electrical parameter, such as a voltage or resistance reading on the displays 14a–14d in accordance with the position of the function switch 15 and range select switch 17. The simulation controller (not shown) will also receive signals from the multimeter 10 corresponding to the position of the function switch 15 and the range select switch 17 to verify that the switches are in the proper location for the measurement being made, and will also format the data to the multimeter 10 in accordance with the location of the switches 15, 17. Thus in this manner, a measurement of high voltages on a simulated system can occur without the voltages actually being present.

Figure 2:
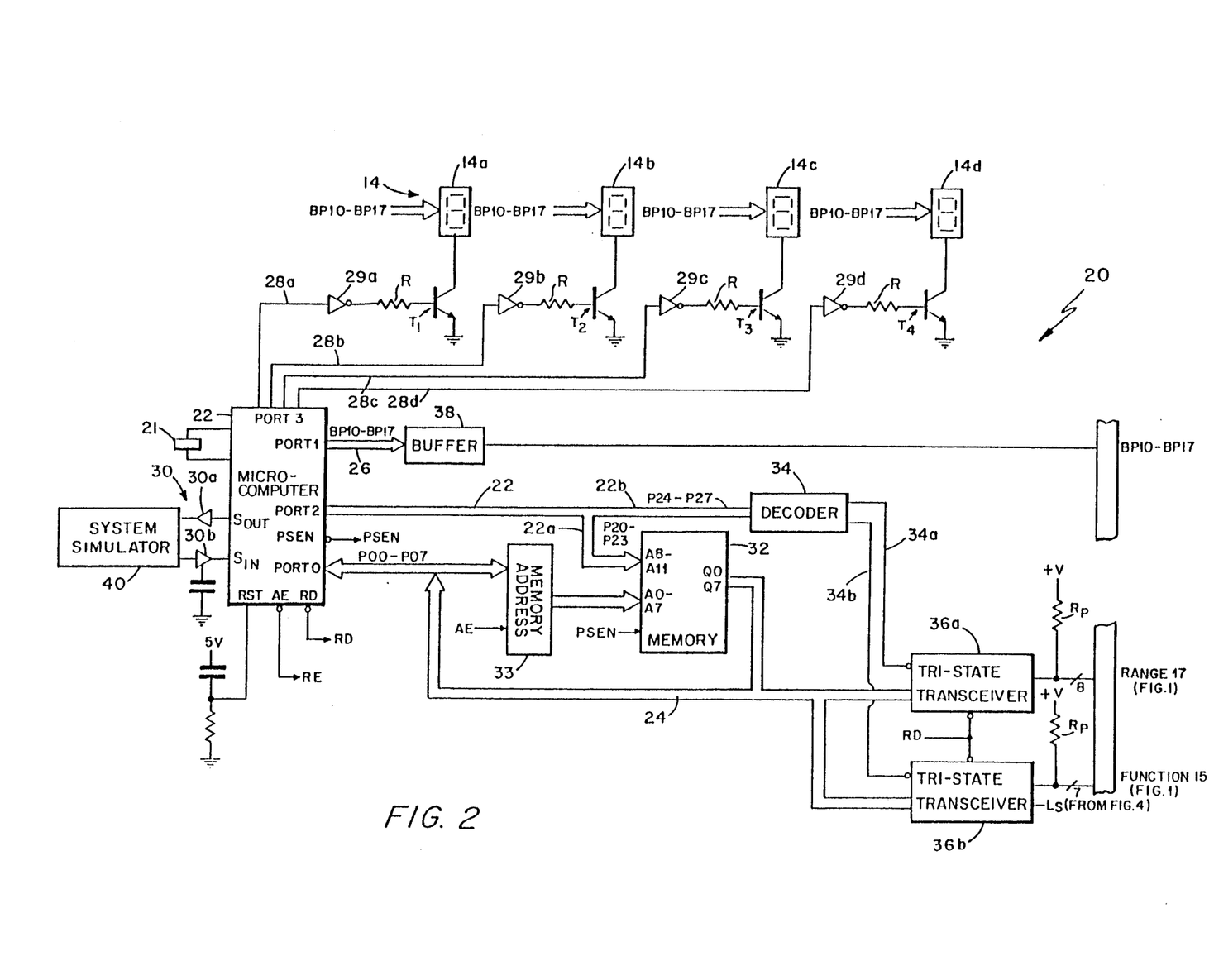
FIG. 2 is a block diagram of the circuit used to provide the simulated multimeter in accordance with the present invention.

Referring now to FIG. 2, the electronic circuits 20 used to provide the multimeter 10 are shown to include a single chip microcomputer 22, here an 8051 type from INTEL, which includes an on-chip full duplex serial channel, a controller, and mask programmable ROM. The microcomputer 22 here provides four ports, port 0–port 3, which are latches coupled to the internal bus (not shown) of the computer 22 and thus which can be used as parallel I/O ports from the computer 22. Here port 1 is used as a data port to provide segment data to LED displays 14a–14d. Here port 1 provides signals on port 1, lines $P_{10}$–$P_{17}$ to a buffer 38 and the buffered signals $BP_{10}$–$BP_{17}$ from said buffer 38 are fed to corresponding segment bits on LEDS 14a–14d to provide a display of a numeric value in each LED 14a–14d. Microcomputer 22 also provides output signals 28a–28d, here said signals are used to drive buffers 29a–29d, as shown. The outputs for the buffers are connected to current limiting resistor R, used to drive transistors $T$–$T_4$, as shown. Here the emitters of transistors $T_1$–$T_4$ are coupled to a reference potential and the collectors of transistors $T_1$–$T_4$ are coupled to ground terminals of each one of the LED displays 14a, 14d, thus providing a ground to the selected digit. This permits current to flow through selected LED segments creating an on display in accordance with the segment data fed into the LED.

Signals 28a–28d are provided from port 3 from the 8051 microcomputer 22. Port 0, lines $P_{00-07}$ provide signals corresponding to the 7 LSBs of the address bus, which are fed to address register 33 during an address cycle. These addresses are stored in address register 33 and fed to memory 32, and provide address bits $A_0$–$A_7$ of memory 32, here a 8×4k EPROM memory. Port 2 provides a portion 22a, which are the 4 most significant (MSBs) for the address to memory 32 and also provides the chip enable "AE" to the address register 33. A second portion 22b of the port signals 22 is used to provide the switch decodes and is fed to a three to eight decoder 34. Three to eight decoder 34 provides a pair of signals along lines 34a, 34b, which are used to enable, here tristate transceivers 36a, 36b. Coincident with a read signal RD fed from microcomputer 22, one of said tristate transceivers 36a, 36b will be enabled to permit either range or function information from range switch 17 and function switch 15 (FIG. 1) or a leads shorted signal LS (FIG. 4) to be coupled onto the data bus 24 and fed into port 0 when port 0 is configured as an input port. Thus, range and function data and the lead shorted signal LS are fed into the microcomputer 22.

The microcomputer formats a serial message, which is fed along the serial outputs out from driver 30a to a system simulator 40. Also from the system simulator 40 is fed a serial data stream into receiver 30b, to terminal $S_{IN}$ of the microcomputer 22. Such data stream corresponds to digital data corresponding to a simulated measurement, electrical parameter value. This data is converted by the microcomputer 22 into an appropriate format, which is fed to the LED displays 14a–14d. Thus, the microcomputer 22 reformats the data and provides 8-bit output words along port 1, which are used to activate the segments on respective displays 14a–14d, as well as one of the decimal point elements in said displays in accordance with the value of the simulated measured parameter and positions of range and function select switches.

To the user of the multimeter 10, the multimeter 10 appears to be a normal multimeter, here with ohm and voltage function selections. The functions set switch 15 allows the user to select AC volts, DC volts, and ohms. The range select switch 17 allows the user to select ranges corresponding to X1, X10, X100, X1k, X10k, and X100k, where k is an abbreviation for 1000. Since the object of using such a simulated meter is in a system which does not have voltages exceeding relatively low voltages, the voltages are simply meter readings controlled by the external simulator. This allows a student to make checks required in a fault isolation procedure, which would otherwise be dangerous on real equipment. Also these permit problems like power supply circuit breakers tripping due to a short circuit to be installed and simulated without damage to the equipment. Here the meter is controlled by 8051 CPU, as described above.

This CPU has an internal serial port and programmable on 2 I/O ports. The program is located in the 4k×8 bit ROM 32 and the display is four, seven-segment LED displays. These displays are multiplex and turned on at a 2,000 hertz rate. Port 0 from computer 22 provides multiplex data and addresses buses 24.

During address time, the bus 24 contains address information, which is fed to address register 33 and is signaled by line AE going high. The output of register 33 is fed to the EPROM 32. During time when the bus 24 contains data information, PSEN is asserted negatively. This permits data from memory 32 or from tristate buffers 36a, 36b to be fed on the data bus 24 to be used by the microcomputer 22. As also mentioned above, port 2 has a portion 22a, (bits P20–P23) which are used as the 4 most significant bits (MSB's) for the memory 32 and are active when the address on register 33 is applied to the memory 32. Port 2, lines 22b are fed to a 3 by 8 decoder to permit the CPU to scan the function switch 15 and range switch 17 on the front panel 12 (FIG. 1). Port 1 of the microcomputer 22 is used as a data bus 26 to provide segments of data to the LED displays 14a–14d, as also described. Here line $P_{10}$ is assigned to segment A, $P_{11}$ is assigned to segment B, and so forth. The program determines which segments should be on for a particular digit in accordance with signals fed from the system simulator 40 along serial interface 30. Using the program contained herein, a 12 megahertz crystal 21 or clock input should be used to clock the CPU 22 to insure that the baud rates for the serial ports are correct. Other arrangements are, of course, possible. The CPU 22 also includes a autopower reset set-up at pin RST of the CPU 22. The power set-up is a series capacitor and resistor connected between 5 volts and ground and which the capacitor charges up to a predetermined level holding terminal RST low until 5 volts has been stabilized on the circuit.

An external reset may also be provided to the microcontroller 22. Read signal, "RD" is fed to transceivers 36a, 36b and is only active when the transceivers are coupled to the data bus 24 to permit the microcomputer to read the switches on the front panel. Pull-up resistors $R_P$ are used to reduce noise created from false switch readings from the front panel. In general, a pull-up resistor would be dedicated to one line and thus for the arrangements shown in FIG. 2, 15 pull-up resistors would be used. Capacitor C, connected to line receiver 30b, is a slew-rate capacitor, as would be commonly known in the art. Buffers 29a-29d are used to drive base electrodes of transistors $T_1-T_4$.

Figure 3:
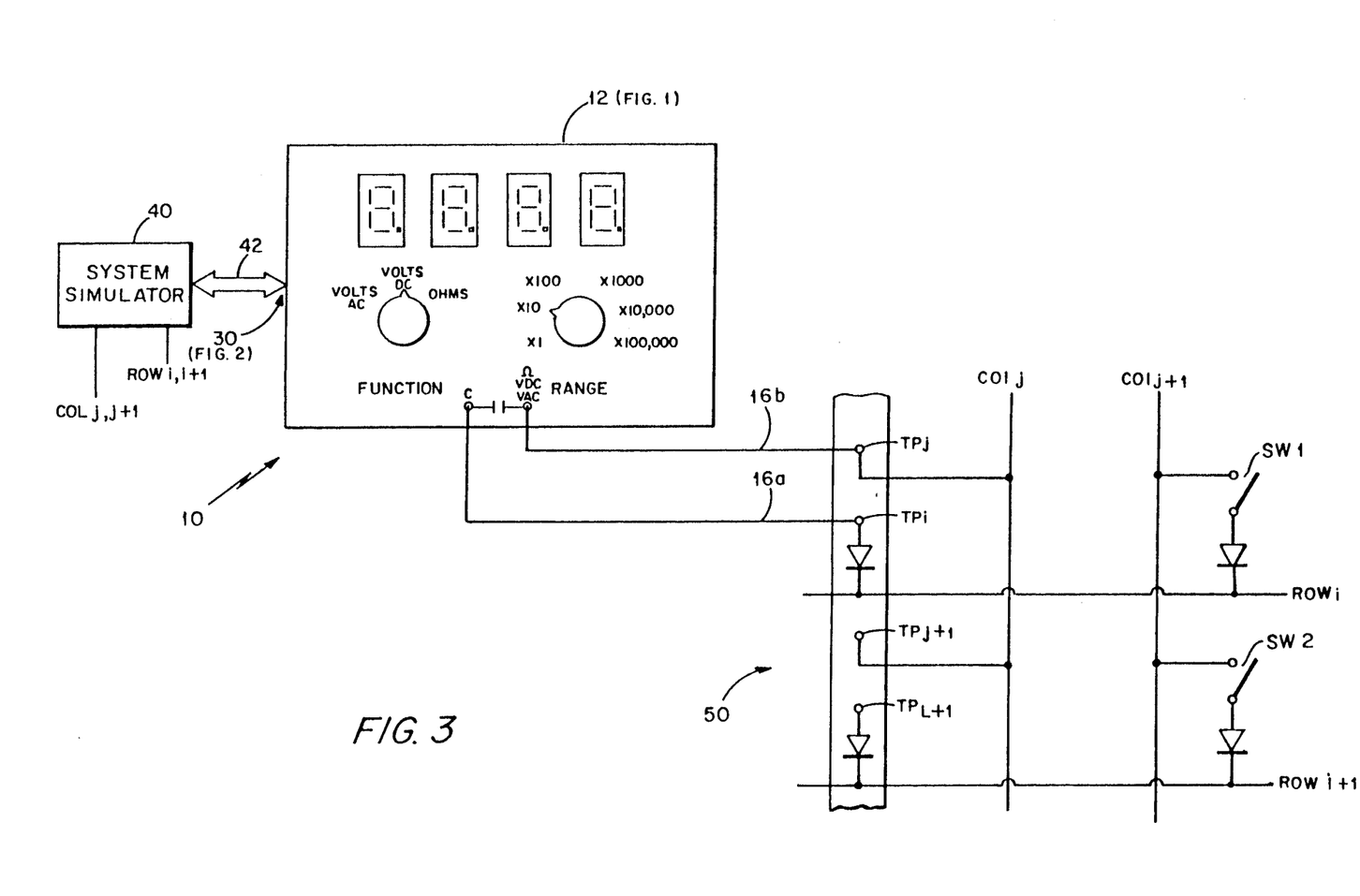
FIG. 3 is a diagrammatical view of one scenario of a simulated multimeter being used to simulate the measurement of a voltage in a simulated system.

Referring now to FIG. 3, a typical example of how the simulated multimeter 10 is used to measure a simulated voltage, is shown. In particular, the multimeter 10 is used in a system simulator 40, which can detect the occurrence of and location of a signal path being made or broken. The system simulator 40 also has, here a serial interface (I/F) to communicate with multimeter 10 via serial I/F port 30, along a serial line 42. A preferred example of such a system is described in our copending application Ser. No. 436,561, filed Nov. 14, 1989 incorporated herein by reference and assigned to the assignee of the present invention. The multimeter 10 has its leads 16a, 16b connecting to a pair of test points, $TP_i$ and $TP_j$, as shown. Here said test points correspond to points on a circuit board module or part of a simulated system 50, such as described in the co-pending application. Here also, such test points are wired together such that test point $TP_j$, $TP_{j+1}$, and so forth are wired by a common line, here $COL_j$. Here $COL_j$ can accommodate up to eight test points. Test points $TP_i$, $TP_{i+1}$ are wired to separate lines here row lines $row_i$, $row_{i+1}$, and so forth. Here eight rows are also used. The number of columns may be any convenient number and in the abovementioned copending application 64 columns are used. In the above application, a so-called switch module is provide to scan the switch matrix detecting whether such switches, (e.g. $SW_1$, $SW_2$) are open or closed. Here the test points also are simulated in the system simulator 40 as a switch. By using a pair of test leads 16a, 16b shorted together via a capacitor 19, proper contact of a pair of test points indicates to the aforementioned switch module that a switch has been closed. The switch module thus detects the state of said switches and test points, the location of the switches and test points, and feeds information to other parts of the system simulator 40 in which determinations are made concerning the appropriateness of the actions. Thus a switch module (not shown) and as described in the above-mentioned application can detect up to 64×8 switches.

The reader is directed to the above application for a complete understanding of how the switch module functions in the simulator 40. Suffice it here to say, however, that the switch module scans each one of the columns contained in the simulated system 50. The switch module sends out a voltage strobe corresponding to a logic "1" sequentially over each one of the column lines $COL_j$, $COL_{j+1}$, and so forth, while the switch module senses each one of the row lines, $row_i$, $row_{i+1}$. In accordance with the state of the switches SW1 and SW2, for example, or here test leads 16a, 16d on test points $TP_i$, $TP_j$ for example, selected ones of the row lines will have the voltage coupled thereto if the corresponding switch or test points are closed (i.e. test points are closed by probing with the pair of test leads 16a, 16b). If the test points are not probed or probed incorrectly or if the switch is not closed, the corresponding row lines will have a logic zero voltage coupled thereto. Thus, a switch open or switch closed state will be detected by the switch module in the system simulator 40. Thus, if for example, the test leads 16a and 16b are on terminals $TP_j$, $TP_i$, the terminals are shorted together (for A.C. signals) internally in the multimeter 10. A signal path is provided from $COL_j$ through test terminal $TP_j$ and lead 16b through capacitor C to test lead 16a, to test point $TP_i$ isolating diode D and to $row_i$. The occurrence of a signal on $row_i$ would be detected therefore by the system simulator 40 and thus the system simulator 40 would determine whether the test leads are on the proper test terminal locations. If the test leads are on the proper test locations, the system simulated 40 may transmit a digital message to the multimeter to display a value of voltage on the multimeter.

Figure 4:
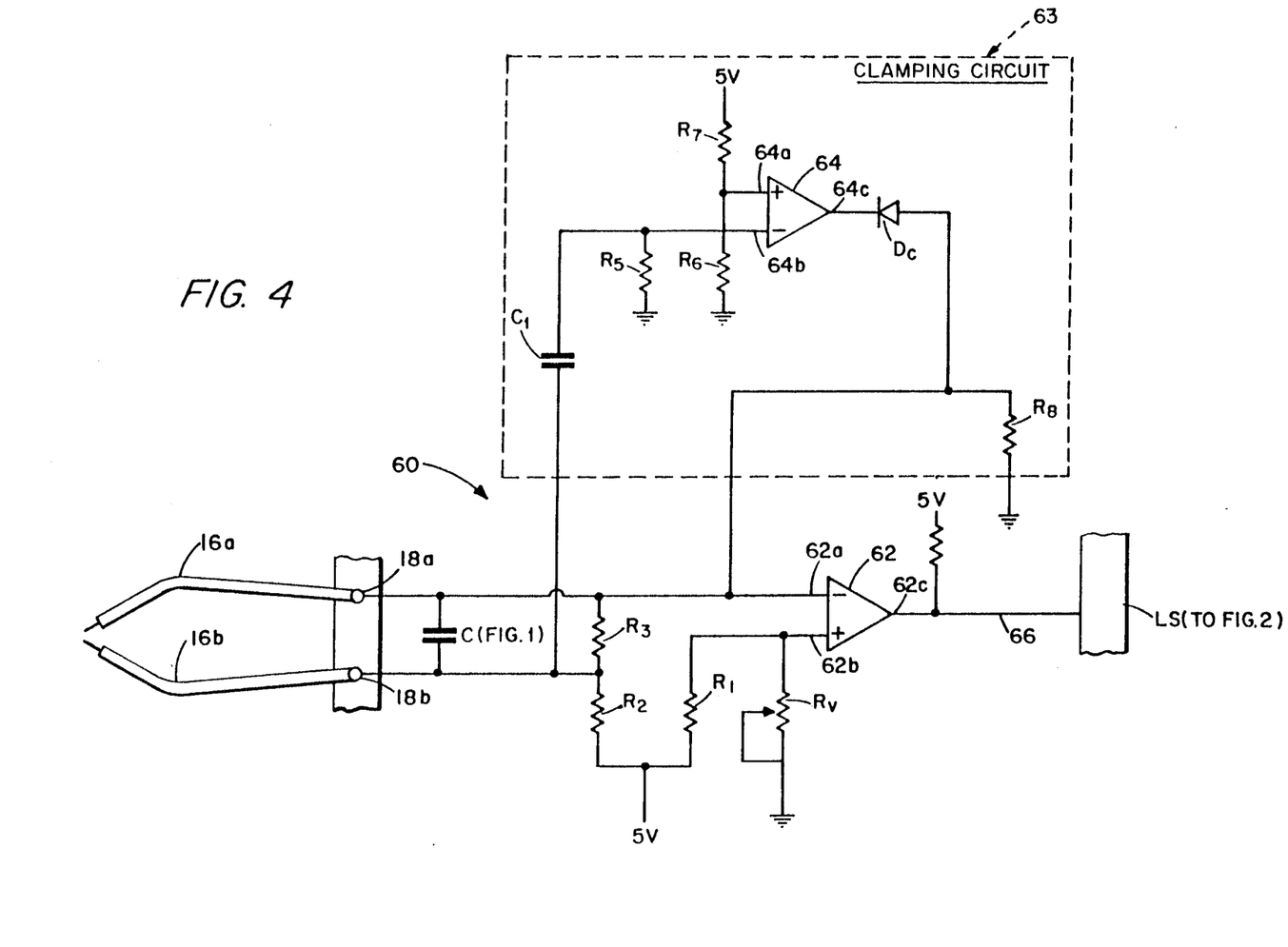
FIG. 4 is a schematic of a circuit connected to test leads of the simulated multimeter to determine when the test leads are shorted together.

However, if the meter function switch is in the ohms position and the test leads are shorted together, the normal indication would be for the display to read 0000. However, since the leads are not directly connected to the multimeter electronics (of FIG. 2), it is necessary for the user device, such as the simulator in the multimeter to detect that the leads of the meter are being shorted together. As shown in FIG. 4, a circuit 60, which senses the leads being shorted together and thus provides an indication to the microcomputer 22 is shown. The circuit 60 includes a comparator 62 having its negative terminal 62a connected directly to one of the leads, here leads 16a and to the output of a second comparator, as will be described. Comparator 62 has its positive input terminal 62b connected to a network including a variable resistance $R_V$ mounted between positive input terminal 62b and ground and a resistor $R_1$ connected between said variable resistor and a voltage potential of here 5 volts. The network further includes a second resistor $R_2$ connected between the 5 volt supply and a common connection with a third resistor $R_3$ and capacitors C, as shown.

The circuit 60 further includes a clamping circuit 63 used to keep the negative terminal 62a of comparator 62 low to prevent a false (0000) indication. For example, when taking a simulated measurement, a strobe on one of the column lines ($COL_j$) will cause a false (0000) indication at the output of 62. By providing a second op amp 64 having its positive input 64a fed a reference voltage via resistive divider $R_6$, $R_7$ and its negative terminal 64b fed the strobe through a capcitor $C_1$, and a resistor $R_5$, as shown, the output of op amp 64 will also be low while the strobe is active, thus insuring that line 66 is not an active low. The output of op amp 64 is connected to input 62a via a diode $D_c$, as shown. A pull down resistor $R_8$ is also provided between such connection and ground.

In normal operation, terminal 62a is at a voltage of about 0.18 volts. Resistor $R_V$ is adjusted so that terminal 62b has a voltage of about 0.25 volts. When the leads are shorted together (i.e. when 16a and 16b are connected, the voltage at terminal 62a will rise to about 0.32 volts forcing the output of the comparator 62 on line 66 to go to a "logic low level." This level is read as a switch input via one of the registers 36a, 36b. This occurrence is fed to the system simulator 40, as described in the above application, and thus the simulator can make a determination that the leads are shorted together. In general the simulator will determine that the leads are shorted together, and send a word over the serial link 30 to the microcomputer 22 to instruct the microcomputer 22 to display 0000 in displays 14a-14d. Alternatively, the microcomputer 22 can be programmed to display 0000 in the displays 14 as is done in the attached computer program. The software listing below is stored in memory 32, and is attached hereto to aid in understanding of the invention. The attached software is written in assembly language for the INTEL 8051.

Having described preferred embodiments of the invention, it will not become apparent to one of skill in the art that other embodiments incorporating their concepts may be used. It is felt, therefore, that these embodiment should not be limited to disclosed embodiments, but rather should be limited only by the spirit and scope of the appended claims.

```
;===========================================================================
;    Copyright (c) Raytheon Service Company, 1989 - All Rights Reserved
;
;    Name: meter.asm
;
;  Author: mgonzalez
;
;
;    Desc: cwar meter code (8051 processor)
;
;    Baud: 1200bps, No parity, 8 bits, 1 stop bit
;
;          Program runs in a continuous loop updating 4 led segment
;          displays, reading 2 rotary switches, and scanning for
;          input commands from the host computer (SIMCON).
;
;                         1st byte   2nd byte   (ascii values)
;                         --------   --------
;              Commands:  0    -     n/a        - send switch positions
;                         1    -     0-9,E,r,-  - update 1st digit to 2 byte val
;                         2    -     0-9,E,r,-  - update 2nd digit to 2 byte val
;                         3    -     0-9,E,r,-  - update 3rd digit to 2 byte val
;                         4    -     0-9,E,r,-  - update 4th digit to 2 byte val
;                         5    -     n/a        - start diag mode
;                         6    -     n/a        - stop diag mode
;
;    Mods:
;
;---------------------------------------------------------------------------

DISP1    EQU    31H              ;CONSTANT LED DISPLAY INT RAM LOCATIONS
DISP2    EQU    32H
DISP3    EQU    33H
DISP4    EQU    34H
SW1      EQU    35H              ;STORE CURRENT SWITCH 1
SW2      EQU    36H              ;STORE CURRENT SWITCH 2
COUNT    EQU    37H              ;DISPLAY DELAY COUNTER
DDIG     EQU    38H              ;DIAG CYCLE DIGITS
DDIG1    EQU    39H              ;DIAG CYCLE DIGITS
;
DIAG     EQU    7FH              ;DIAG BIT FLAG
DFLAG    EQU    7EH              ;DATA READT FLAG
;
SWITCH1  EQU    9000H            ;SWITCH SCAN 1
SWITCH2  EQU    8000H            ;SWITCH SCAN 2
;
;---------------------------------------------------------------------------
;
DIG1:    REG    P3.3             ;T0    DIGIT 1
DIG2:    REG    P3.2             ;T1    DIGIT 2
DIG3:    REG    P3.5             ;INT0  DIGIT 3
DIG4:    REG    P3.4             ;INT1  DIGIT 4
;
;---------------------------------------------------------------------------
;
         ORG    0000H
;
INIT:    MOV    P1,#00           ;ZERO OUT SEGMENTS
         CLR    DIG1             ;CONFIG AS OUT
         CLR    DIG2             ;CONFIG AS OUT
         CLR    DIG3             ;CONFIG AS OUT
```

```
        CLR     DIG4            ;CONFIG AS OUT
;
        CLR     DIAG            ;START WITH DIAGS OFF
;
        MOV     COUNT,#0        ;CLEAR DISPLAY COUNTER
        MOV     DISP1,#0        ;CLEAR ALL 4 DISPLAYS
        MOV     DISP2,#0
        MOV     DISP3,#0
        MOV     DISP4,#0
        CALL    DISPLAY
;
        MOV     TMOD,#20H       ;SET-UP
        MOV     SCON,#52H       ;INIT SERIAL PORT TO N,8,1
        MOV     TCON,#0D2H
        MOV     TH1,#0E5H       ;1200 BAUD
        SETB    TR1
        CLR     DFLAG           ;NO CHAR
;
;------------------------------------------------------
;
MAIN:   CALL    DISPLAY
        MOV     DPTR,#SWITCH1   ;POINT TO 1ST SW POS
        MOVX    A,@DPTR         ;GET 1ST SWITCH POS
        ANL     A,#3FH          ;MASK UPPER 2 BITS
        MOV     SW1,A           ;STORE SWITCH 1 POS
        MOV     DPTR,#SWITCH2   ;POINT TO 2ND SW POS
        MOVX    A,@DPTR         ;GET 2ND SWITCH POS
        ANL     A,#3FH          ;MASK UPPER 2 BITS
        MOV     SW2,A           ;STORE SWITCH 2 POS

CALL    SIN             ;CHECK FOR CHAR IN
        JB      DFLAG,NXC       ;YES, CHAR IN
        SJMP    ENDM

NXC:    CLR     DFLAG
        CALL    DISPLAY         ;UPDATE DISPLAY
NXC1:   CJNE    A,#30H,NXC2     ;CHK FOR SEND SWITCH COMMAND
        MOV     A,SW1
        CALL    SOUT            ;SEND SWITCH 1 POS
        MOV     A,SW2
        CALL    SOUT            ;SEND SWITCH 2 POS
        SJMP    ENDM
NXC2:   CJNE    A,#31H,NXC3     ;CHK FOR DIG1 DISPLAY
        CALL    SELECT
NXC3:   CJNE    A,#32H,NXC4     ;CHK FOR DIG2 DISPLAY
        CALL    SELECT
NXC4:   CJNE    A,#33H,NXC5     ;CHK FOR DIG3 DISPLAY
        CALL    SELECT
NXC5:   CJNE    A,#34H,NXC6     ;CHK FOR DIG4 DISPLAY
        CALL    SELECT
NXC6:   CJNE    A,#35H,NXC7     ;CHK FOR DIAG MODE ON
        SETB    DIAG
NXC7:   CJNE    A,#36H,ENDM     ;CHK FOR DIAG MODE OFF
        CLR     DIAG
ENDM:   JB      DIAG,DIAGS      ;DO DIAGS IF DIAG BIT ON
        SJMP    MAIN

;
;------------------------------------------------------
;
SELECT: PUSH    A
        MOV     R0,A            ;STORE ADDR TO DISPLAY MEMORY
        MOV     DPTR,#DIGVAL    ;POINT TO DIGIT TABLE
SEL1:   CALL    DISPLAY         ;UPDATE DISPLAY
        CALL    SIN             ;CHK FOR SERIAL CHAR IN
        JNB     DFLAG,SEL1      ;NO, WAIT FOR CHAR
        CLR     DFLAG           ;CLEAR CHAR READY FLAG
        MOV     @R0,#00H        ;CLEAR CURRENT SEGMENT
        JNB     ACC.7,SEL2      ;CHK FOR DOT
        CLR     ACC.7           ;MASK HIGH ACC BIT
        MOV     @R0,#80H        ;SET HIGH BIT FOR DECIMAL
```

```
SEL2:    SUBB    A,#30H              ;ADJUST INDEX
         MOVC    A,@A+DPTR           ;INDEX INTO DISPLAY TABLE
         ORL     A,@R0               ;UPDATE DIGIT 1 CONTENTS
         MOV     @R0,A               ;STORE SEGMENT
         POP     A
         RET
;
;------------------------------------------------------------
;
DIAGS:   MOV     DDIG,#0
         MOV     DDIG1,#0
         MOV     A,#8                ;ROTOTE VALUE
         MOV     DISP3,#0            ;CLEAR DISPLAY 3
         MOV     DISP2,#0            ;CLEAR DISPLAY 2
         MOV     DISP4,#0            ;CLEAR DISPLAY 4
         MOV     DISP1,#0FFH         ;DISPLAY 1
         CLR     DFLAG
DIAG1:   CALL    DISPLAY
         CALL    SIN                 ;CHK FOR IN CHAR
         JB      DFLAG,DGOUT         ;YES, CHAR IN
DIAG2:   DJNZ    DDIG1,DIAG1
         RRC     A
         JNC     DG2
         CLR     C                   ;CLEAR CARRY
         MOV     A,#8                ;RESET COUNT
DG2:     JNB     ACC.2,DG3
         MOV     DISP1,#0            ;CLEAR DISPLAY 1
         MOV     DISP2,#0FFH         ;DISPLAY 2
DG3:     JNB     ACC.1,DG4
         MOV     DISP2,#0            ;CLEAR DISPLAY 2
         MOV     DISP3,#0FFH         ;DISPLAY 3
DG4:     JNB     ACC.0,DG1
         MOV     DISP3,#0            ;CLEAR DISPLAY 3
         MOV     DISP4,#0FFH         ;DISPLAY 4
DG1:     JNB     ACC.3,DRST
         MOV     DISP4,#0            ;CLEAR DISPLAY 4
         MOV     DISP1,#0FFH         ;DISPLAY 1
DRST:    SJMP    DIAG1
DGOUT:   MOV     DISP1,#0            ;CLEAR ALL 4 DISPLAYS
         MOV     DISP2,#0
         MOV     DISP3,#0
         MOV     DISP4,#0
         LJMP    NXC
;
;------------------------------------------------------------
;
DISPLAY: MOV     P1,DISP1            ;UPDATE SEGMENT 1
DIS1:    CLR     DIG1                ;KEEP DISPLAY ON
         DJNZ    COUNT,DIS1          ;IF NOT 0 DIG ON
         SETB    DIG1                ;TURN DISPLAY OFF
         MOV     P1,DISP2            ;UPDATE SEGMENT 2
DIS2:    CLR     DIG2                ;KEEP DISPLAY ON
         DJNZ    COUNT,DIS2          ;IF NOT 0 DIG ON
         SETB    DIG2                ;TURN DISPLAY OFF
         MOV     P1,DISP3            ;UPDATE SEGMENT 3
DIS3:    CLR     DIG3                ;KEEP DISPLAY ON
         DJNZ    COUNT,DIS3          ;IF NOT 0 DIG ON
         SETB    DIG3                ;TURN DISPLAY OFF
         MOV     P1,DISP4            ;UPDATE SEGMENT 4
DIS4:    CLR     DIG4                ;KEEP DISPLAY ON
         DJNZ    COUNT,DIS4          ;IF NOT 0 DIG ON
         SETB    DIG4                ;TURN DISPLAY OFF
DIS5:    RET
;
;------------------------------------------------------------
;
SOUT:    JNB     TI,SOUT             ;SERIAL OUTPUT ROUTINE
         CLR     TI
         MOV     SBUF,A
         RET
;
;------------------------------------------------------------
;
```

```
SIN:    JNB     RI,SIN1
        CLR     RI
        MOV     A,SBUF
        SETB    DFLAG           ;DATA FLAG
SIN1:   RET
;
;----------------------------------------------------
;
DIGVAL  DB      3FH,6H,5BH,4FH,66H,6DH,7DH,7H,7FH,67H
        DB      77H,7CH,39H,5EH,79H,71H,50H,40H
;
        END
;
; Copyright (c) Raytheon Service Company, 1989 - All Rights Reserved
```

What is claimed is:

1. A simulated multimeter having a function switch and a range switch, said simulated multimeter comprising:
    means fed by digital display data signals for providing a numeric display corresponding to a number represented by said digital display data signals; and
    controller means, fed by a plurality of switch signals which correspond to the selected settings of said function switch and said range switch and fed by an input data stream corresponding to a value of a simulated electrical parameter which represents a value of an actual electrical parameter without said actual electrical parameter being present, wherein said value of the simulated electrical parameter is related to said plurality of switch signals, for converting said input data stream into digital display data signals.

2. The simulated multimeter of claim 1 wherein said controller means comprises:
    a microcomputer comprising:
        (a) a full duplex serial channel means for providing an output serial signal path for producing a data stream related to said plurality of switch signals and for providing an input serial signal path fed by said input data stream provided by a system simulator;
        (b) a first parallel interface means for providing a first parallel signal path; and
        (c) a second parallel interface means fed by said plurality of switch signals for inputting said switch signals into the microcomputer;
    a pair of buffer devices coupled between said second parallel interface and said range and function switches, and responsive to a control signal to couple said plurality of switch signals to said second parallel interface means; and
    means fed by signals from said first parallel interface means for providing said control signal to select one of said buffer devices.

3. The simulated multimeter of claim 2 further comprising:
    a memory for storing a plurality of program instructions for controlling said microcomputer to convert said input data stream into digital display data signals corresponding to a simulated measurement of electrical parameters;
    wherein said first parallel interface means provides a first portion of a memory address to said memory and said second parallel interface means provides a second portion of said memory address for selecting one of said program instructions when said second interface means is in a first directional mode, and said microcomputer is fed said program instruction related to said first and second portions of said memory address when said second interface means is in a second directional mode.

4. The simulated multimeter of claim 3 wherein said memory is a programmable read only memory.

5. The simulated multimeter of claim 4 further comprising:
    an external network coupled to said system simulator, wherein said network has a plurality of selectable circuit paths; and
    a pair of test leads for selecting one of said plurality of selectable paths;
    wherein said system simulator includes means for determining which one of said plurality of selectable circuit paths is selected by said pair of test leads and a means for providing said input data stream related to said simulated electrical parameter values of said selected circuit path to said controller means.

6. The simulated multimeter of claim 1 further comprising:
    an external network coupled to said system simulator, wherein said network has a plurality of selectable circuit paths; and
    a pair of test leads for selecting one of said plurality of selectable paths;
    wherein said system simulator includes means for determining which one of said plurality of selectable circuit paths is selected by said pair of test leads and a means for providing said input data stream related to said simulated electrical parameter values of said selected circuit path to said controller means.

7. A simulated multimeter comprising:
    a function switch for selecting one of a plurality of electrical parameter settings;
    a range switch for selecting one of a plurality of scale factor settings associated with a corresponding one of the electrical parameter settings;
    a digital display fed by digital display data signals corresponding to a number represented by said digital display data signals;
    controller means, fed by a first data stream corresponding to said electrical parameter settings and said electrical scale factor settings from said function switch and said range switch and fed by a second data stream corresponding to simulated electrical parameter values related to said plurality of electrical parameter and scale factor settings, for converting said second data stream into the digital display data signals, said controller means comprising:

(a) a microcomputer comprising:
   (i) a full duplex serial channel means for providing an output serial signal path fed by said first data stream related to said plurality of electrical parameter and scale factor settings and for providing an input serial signal path fed by said second data stream provided by a system simulator and related to said input data stream;
   (ii) a first parallel interface means for providing a control signal; and
   (iii) a second parallel interface means for providing a second parallel signal path fed by said electrical parameter and scale factor settings;

(b) a pair of buffer devices coupled to said second parallel interface means for transferring one of said electrical parameter and scaler factor settings to said microcomputer; and (c) a decoder fed by said control signal from said first parallel interface means to provide signals to select one of said buffer devices along a third signal path;

an external network coupled to said system simulator, wherein said network has a plurality of selectable circuit paths; and a pair of test leads for selecting one of said plurality of selectable circuit paths, wherein said system simulator includes means for providing said first data stream related to a circuit path selected by said pair of test leads.

* * * * *